United States Patent
Williams

(10) Patent No.: US 7,743,417 B2
(45) Date of Patent: Jun. 22, 2010

(54) DATA STORAGE DEVICE WITH CODE SCANNING CAPABILITY

(75) Inventor: Larry Lynn Williams, Los Altos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1274 days.

(21) Appl. No.: 11/069,286

(22) Filed: Feb. 28, 2005

(65) Prior Publication Data

US 2006/0195904 A1 Aug. 31, 2006

(51) Int. Cl.
G06F 11/00 (2006.01)
G06F 12/14 (2006.01)
G06F 12/16 (2006.01)
G08B 23/00 (2006.01)

(52) U.S. Cl. .......................... 726/24; 713/188

(58) Field of Classification Search .................. 726/24, 726/22, 23, 25; 713/188
See application file for complete search history.

(56) References Cited

U.S. PATENT DOCUMENTS

| | | | |
|---|---|---|---|
| 4,268,905 A * | 5/1981 | Johann et al. | 703/13 |
| 5,023,831 A * | 6/1991 | Bonke et al. | 710/16 |
| 5,327,549 A * | 7/1994 | Nissimov et al. | 713/2 |
| 5,509,120 A * | 4/1996 | Merkin et al. | 726/24 |
| 5,640,286 A * | 6/1997 | Acosta et al. | 360/48 |
| 5,659,801 A | 8/1997 | Kopsaftis | |
| 5,701,450 A * | 12/1997 | Duncan | 712/245 |
| 5,812,564 A * | 9/1998 | Bonke et al. | 714/769 |
| 5,966,732 A * | 10/1999 | Assaf | 711/170 |
| 6,249,887 B1 * | 6/2001 | Gray et al. | 714/47 |
| 6,285,999 B1 | 9/2001 | Page | |
| 6,421,779 B1 | 7/2002 | Kuroda et al. | |
| 6,522,495 B1 * | 2/2003 | Lamberts et al. | 360/77.04 |
| 6,591,328 B1 * | 7/2003 | Iida et al. | 711/103 |
| 6,600,614 B2 * | 7/2003 | Lenny et al. | 360/31 |
| 6,608,729 B1 * | 8/2003 | Willems et al. | 360/69 |
| 6,625,713 B2 * | 9/2003 | Iida et al. | 711/206 |
| 6,728,830 B1 * | 4/2004 | Assaf | 711/112 |
| 6,799,176 B1 | 9/2004 | Page | |
| 6,813,682 B2 * | 11/2004 | Bress et al. | 711/112 |
| 6,826,250 B2 * | 11/2004 | Groo | 377/47 |
| 6,868,496 B2 * | 3/2005 | Sales et al. | 713/193 |
| 6,980,381 B2 * | 12/2005 | Gray et al. | 360/31 |
| 6,996,501 B1 * | 2/2006 | Rothberg | 702/186 |
| 7,072,138 B2 * | 7/2006 | Schmidt | 360/78.04 |
| 7,155,616 B1 * | 12/2006 | Hamlin | 713/193 |
| 7,194,659 B2 * | 3/2007 | Buchanan et al. | 714/36 |
| 7,239,468 B2 * | 7/2007 | Murai et al. | 360/69 |
| 7,346,810 B2 * | 3/2008 | Bartlett et al. | 714/42 |

(Continued)

*Primary Examiner*—David García Cervetti
(74) *Attorney, Agent, or Firm*—G. Marlin Knight

(57) ABSTRACT

A disk drive according to the invention has a processor for executing a program for identifying harmful computer code (HCC). A communication protocol with the host computer according to the invention provides means for the host to control the HCC detection process, receive information about the HCC detection from the disk drive and preferably for the HCC detection program to be transmitted to the disk drive. In a preferred embodiment a disk drive has a scanning program for scanning data for harmful computer code (HCC) using a set of HCC signatures. In one embodiment, the disk drive has means for communicating with a controlling host computer which implements the HCC protocol and a user computer which does not implement the HCC protocol, to allow the user computer to be protected from HCC in a transparent way.

16 Claims, 6 Drawing Sheets

U.S. PATENT DOCUMENTS

| | | | |
|---|---|---|---|
| 7,401,361 B2* | 7/2008 | Freeman et al. | 726/22 |
| 7,581,252 B2* | 8/2009 | Challener et al. | 726/24 |
| 7,581,253 B2* | 8/2009 | Challener et al. | 726/24 |
| 2002/0036850 A1* | 3/2002 | Lenny et al. | 360/31 |
| 2002/0040418 A1* | 4/2002 | Bress et al. | 711/112 |
| 2002/0060868 A1* | 5/2002 | Lenny et al. | 360/31 |
| 2002/0124130 A1* | 9/2002 | Iida et al. | 711/103 |
| 2002/0133714 A1* | 9/2002 | Sales et al. | 713/200 |
| 2002/0162075 A1 | 10/2002 | Talagala et al. | |
| 2002/0166059 A1* | 11/2002 | Rickey et al. | 713/200 |
| 2003/0033536 A1 | 2/2003 | Pak et al. | |
| 2003/0131112 A1* | 7/2003 | Yu | 709/229 |
| 2003/0227703 A1 | 12/2003 | Hinshaw | |
| 2004/0083384 A1* | 4/2004 | Hypponen | 713/200 |
| 2004/0228533 A1 | 11/2004 | Adelmann | |
| 2004/0236960 A1* | 11/2004 | Zimmer et al. | 713/200 |
| 2004/0243745 A1 | 12/2004 | Bolt et al. | |
| 2005/0034012 A1* | 2/2005 | Bartlett et al. | 714/5 |
| 2005/0144612 A1* | 6/2005 | Wang et al. | 717/168 |
| 2005/0197840 A1* | 9/2005 | Wang et al. | 704/260 |
| 2005/0246485 A1* | 11/2005 | Assaf et al. | 711/112 |
| 2006/0007582 A1* | 1/2006 | Murai et al. | 360/75 |
| 2006/0021032 A1* | 1/2006 | Challener et al. | 726/22 |
| 2006/0021041 A1* | 1/2006 | Challener et al. | 726/24 |
| 2006/0026283 A1* | 2/2006 | Trueba | 709/225 |
| 2006/0080737 A1* | 4/2006 | Freeman et al. | 726/24 |
| 2008/0147927 A1* | 6/2008 | Lin | 710/62 |
| 2008/0291799 A1* | 11/2008 | Hanks et al. | 369/47.53 |

* cited by examiner

DATA STORAGE DEVICE WITH CODE SCANNING CAPABILITY

FIELD OF THE INVENTION

The invention relates to data storage devices such as disk drives with, the architecture of the communication interface between the data storage devices and host computer and more particularly to methods and means for executing special programs on the data storage device such as programs to search for harmful computer codes such as viruses and worms.

BACKGROUND OF THE INVENTION

Prior art data storage devices such as disk drives have drive control systems including means for accepting commands from a host computer including commands related to self-testing, calibration and power management. Each drive has programming code (microcode) in nonvolatile memory for execution by a controller, which is a special purpose processor, to enable it to perform essential functions. The microcode can be updated through the drive's communication interface as described, for example, in U.S. Pat. No. 5,659,801 to Kopsaftis. Various standard communication interfaces with both hardware components and command protocols are commonly used such as IDE, SCSI, Serial ATA, and Fibre Channel Arbitrated Loop (FC-AL).

Commercially available disk drives cannot perform any operation on the data other than those directly related to its storage, for example, performing error correction computations. There have been some suggestions for enhancing disk drives (HDD) by adding an application-specific component for receiving and executing application-specific instructions. Published US patent application 20030227703 by F. D. Hinshaw, describes application-specific components which can perform application-specific tasks, such as database operations, using data on the HDDs and return results to a local host or even a remote host via a network. Examples of the application-specific component include a circuit board or an integrated circuit such as an Application Specific Integrated Circuit (ASIC), Field Programmable Gate Array (FPGA), Central Processing Unit (CPU), or Digital Signal Processor (DSP). The additional component is capable of receiving application-specific instructions via a standard network connection and executing these application-specific instructions on the data contained on the disks. The application-specific component may be in the form of an add-on board which couples to the controller circuit or, alternatively, in the form of an application-specific chip which mates with a socket provided on the controller circuit.

In US patent application 20020162075 by Talagala, et al. a storage system is described which includes a storage array controller and a storage array. The storage array controller issues scrubbing operation commands to one or more of the disk drive controllers. In response, each disk drive controller that receives a scrubbing operation command reads data from within a data range from at least one of the disk drives, calculates a new checksum for the data, and compares the new checksum to a preexisting checksum for the data. If the new checksum doesn't equal the preexisting checksum, the data within the data range is determined to be erroneous.

The task of searching for and protecting against harmful computer code such as computer viruses, worms, Trojan horses, etc. is typically executed by a computer using an application program and a definition file which contains the so-called signatures of known harmful computer codes. The definition file is designed to be updated regularly from the Internet, so that recently identified codes can be found without having to update the application program itself. One example of a system for updating a virus signature database in a mobile wireless device is described in US patent application 20040083384 by Ari Hypponen. The anti-virus application and virus signature database are resident in the memory of the device. Management messages containing for example new virus signatures are sent from the network to the device. In accordance with instructions contained in the management messages, individual signature entries of the virus signature database are deleted or replaced, and new signatures added.

In US patent application 20030033536 by Pak, et al. a method for programmable scanning for malicious content on a wireless client device is described. The system uses a signature file for uniquely identifying a computer virus and a virus detection section comprising object code providing operations to detect the identified computer virus on the thin client device. The signature file is also installed on the thin client device. In one embodiment, the instruction set is capable of implementing the functionality of a Discrete Finite Automation (DFA) in a programmable assembly-like computing language which allows detection of multiple viruses at the same time without having to scan for them individually. In such an embodiment, the machine begins with a pointer into the input stream and a start state. Based on what byte is found at the pointer, the machine moves to a specified state. For each transition, the pointer is moved forward to the next byte. The machine ends with a stop state that identifies which infection was identified or none. The DFA's for several types of malicious code can be combined into a single DFA that scans for all such types of malicious code at the same time.

SUMMARY OF THE INVENTION

A disk drive according to the invention has a processor for executing a program for identifying harmful computer code (HCC). A communication protocol with the host computer according to the invention provides means for the host to control the HCC detection process, receive information about the HCC detection from the disk drive and preferably for the HCC detection program to be transmitted to the disk drive. The HCC detection program can use any method for detecting HCC. In a preferred embodiment a disk drive according to the invention has a processor for executing a scanning program for scanning data for harmful computer code (HCC) using a set of HCC signatures. Preferably the disk drive maintains a scan status for blocks of data stored on the disk(s) indicative of whether the blocks have been scanned and whether HCC was detected. Preferably the communication protocol with the host computer allows the HCC signatures to be transmitted to the disk drive separately from the scanning program, but the HCC signatures can also be embedded in the scanning program. A scanning program can be installed at the factory, but preferably the scanning program can also be transmitted to the disk drive by the host to allow updating the drive's capability in the field. The disk drive includes means for notifying the host when HCC is detected on a read or write operation and means for allowing the host to override the HCC detection. In a particular embodiment, the disk drive has means for scanning stored data "off-line" when it is otherwise idle. In another particular embodiment, the disk drive has means for communicating with a controlling host computer which implements the HCC protocol and a user computer which does not. In this embodiment, the user computer is protected from HCC in a transparent way. In another particular embodiment, the disk drive has means for reading data from other disk drives on a common bus and scanning that data for HCC.

DETAILED DESCRIPTION OF THE INVENTION AND THE PREFERRED EMBODIMENTS

Figure 1:
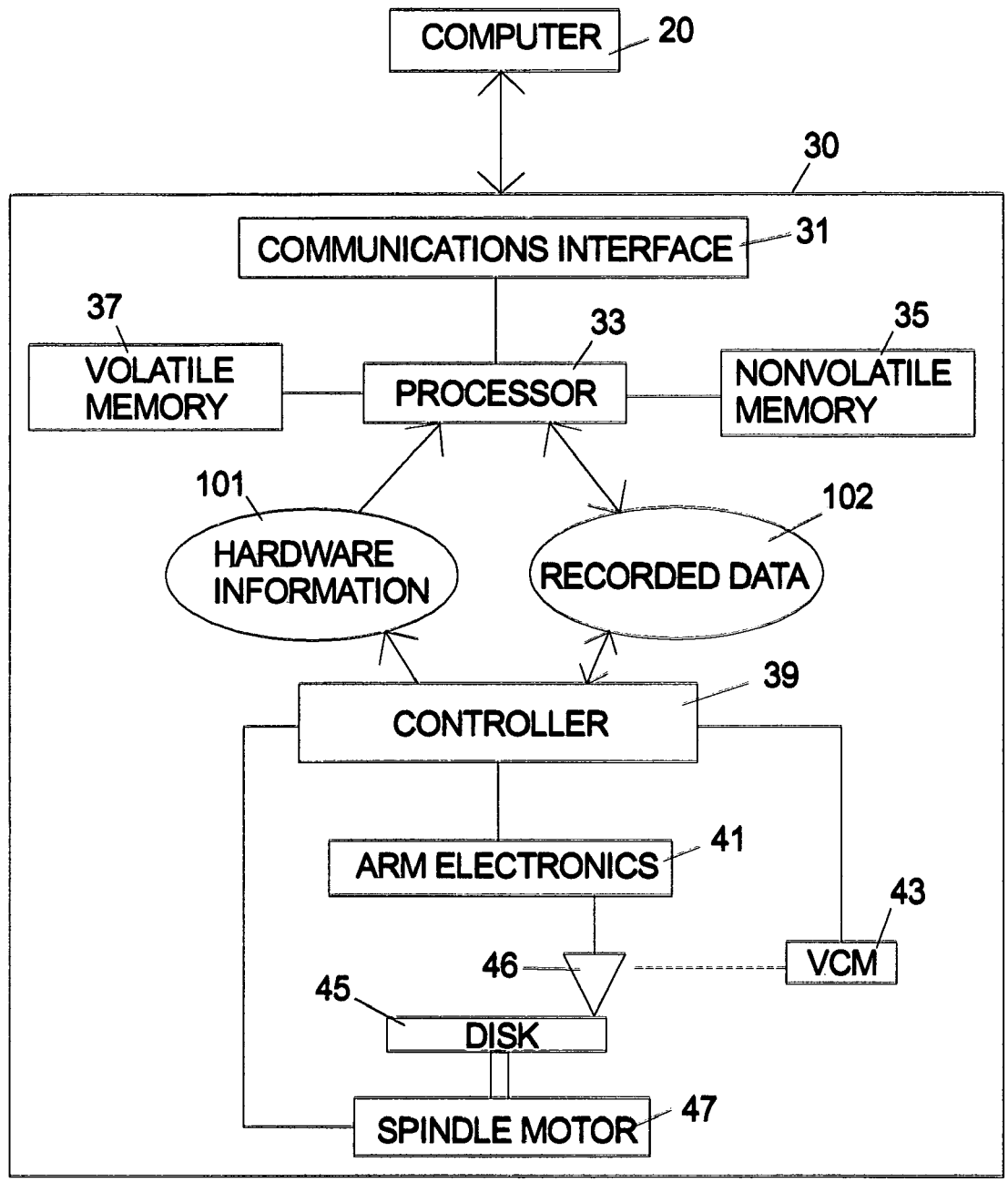
FIG. 1 is an illustration of selected components of a disk drive according to the invention.

FIG. 1 is a symbolic illustration of a disk drive 30 according to the invention which will be called an "intelligent disk drive." Information, commands, data, etc. flow back and forth between the host computer 20 and the disk drive 30 through communications interface 31 which can be any hardware interface including any of the prior art interfaces currently in use. The disk drive includes a general-purpose microprocessor 33 which accesses both volatile memory 37 and nonvolatile memory 35. The program code for the microprocessor 33 can be stored in either the volatile memory 37 or nonvolatile memory 35. The program code can originate in the nonvolatile memory 35 in the form of a preprogrammed device such as an EEprom. The program code can also originate from the host computer 20. The disk drive 30 is shown as including a separate controller 39, but in an alternative embodiment the microprocessor can be designed to handle all of the tasks normally performed by a controller and the controller can be omitted. The arm electronics 41, voice coil motor (VCM) 43, disk 45, spindle motor 47 and head 46 are according to the prior art. In each embodiment the microprocessor has access to the hardware information 101 which includes detailed information about the state of the components which can be used to optimize the execution of the special purpose tasks which are defined herein. The recorded data 102 is the standard data which is stored on and retrieved from the disk drive.

Figure 2:
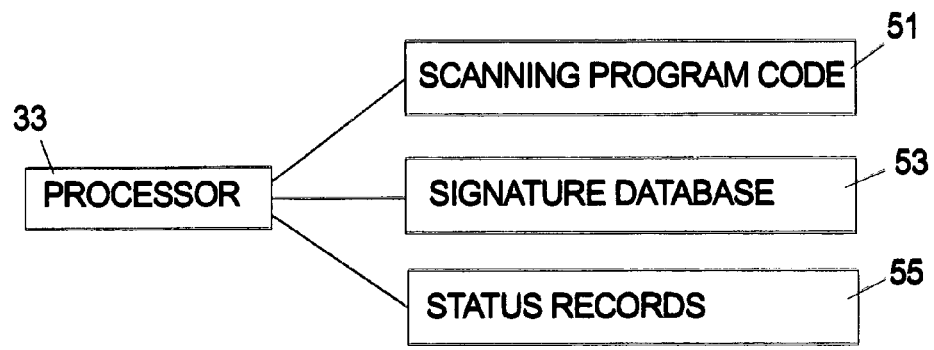
FIG. 2 is an illustration of harmful computer code (HCC) data organization in a disk drive according to a first embodiment of the invention.

The disk drive according to the invention is designed to execute special purpose tasks which relate to the recorded data 102 such as scanning for harmful computer code (HCC) which includes all types of computer viruses, worms, trojan horses, etc. FIG. 2 illustrates the organization of the program and data used by the processor 33 for the task. In the embodiment described herein the disk drive has scanning program code 51 which includes the capability of searching a data stream for one or more HCC signatures which are recorded in a signature database or set 53. A set of status records 55 which include flags to record a unit of data as being infected, as well as, other status information is maintained by the program 51. In this embodiment a set of signatures is used to define the HCC being sought. The scanning program is not limited to scanning for the signatures and can include any other techniques for detecting HCC which are applicable to analyzing a data stream for HCC. In alternative embodiments the HCC signature can be embedded in the scanning program. In other embodiments the HCC signatures can be omitted and the scanning program can execute as a self-contained program using, for example, heuristic algorithms. The communications interfaces (IDE, SCSI, Serial ATA, Fibre Channel Arbitrated Loop (FC-AL), etc.) used between host computers and disk drives define a format through which the host can give commands and data to the disk drive. The invention can be implemented within the general framework of any of these systems with limited modifications which will be described below. One modification according to the invention provides a method for the computer to send the harmful computer code signatures to the disk drive for temporary or long term storage in volatile or nonvolatile memory or on the disk. Currently hundreds of harmful computer code signatures are known and more are regularly discovered; therefore, the disk drive preferably will store a set of signatures, and have programming code for searching the read/write data stream iteratively for each signature. The syntax for the set of signatures can be defined according to the prior art methods. Although the program code for scanning (Scanning Program) can be recorded in the drive at the manufacturer, preferably there will be a way for the host to update the Scanning Program in the drive in the field so that improvements can be made.

The details of when and what data the drive scans for the signatures can be implemented in a variety of embodiments. For example, commands could be implemented so that the drive only scans when the computer specifically requests it. The disk drive could scan data only for read requests. However, in a preferred embodiment, the drive scans all read and write data by default. Since there are multiple signatures the disk drive must have programming code for searching the designated data iteratively for each signature. The host computer can signal the drive to do the harmful computer code search for data supplied in a write command or to scan the data requested in a read command before sending it to the computer. The scans associated with read and write commands will be referred to as "streaming" or "in-line" scans. In addition, in one set of embodiments the drive performs batch or "off-line" scanning of some or all of data stored on the disk in the background to use otherwise free time to perform the task.

The disk in current disk drives rotates on the order of 100 to 200 times per second. The time for one rotation can be estimated as 5 to 10 milliseconds. Since microprocessors are available which operate on GHz clocks, times in milliseconds potentially allow time for significant processing to occur while the drive would otherwise be waiting on the mechanical components. In a preferred embodiment the HCC scanning occurs in parallel with the normal disk drive functions so that negligible delay, if any, occurs in delivering the data read from the drive.

Preferably, provision is made to handle the case where a harmful computer code segment extends across a data block boundary. The data transmitted to and from the host computer is typically grouped into fixed length blocks and scanning each block separately would create a blind spot at the boundaries. In the more general case, a series of blocks is stored in the drive's memory and the blocks are scanned for harmful computer codes that may extend over more than one block.

The detection of one of the harmful computer code signatures triggers the disk drive to send an error code or message to the host computer which can then initiate a series of appropriate actions. The results available to be sent to host computer can optionally include an identifier for the detected signature (or the signature itself), the block identifier and the location inside the block where the signature was found. Preferably the drive will also record the result in its internal memory status for later use. The block can be flagged by the drive, so that it does not need to be scanned again unless new data is written or the signatures or the Scanning Program are updated. Preferably, the drive will not erase the data and the command protocol will include a way to override the indicator, since false positives are possible for any signature.

In addition to the "streaming" scanning technique described above, an embodiment of the invention periodically can scan all the data stored on the disk drive and flag or quarantine those blocks that contain a suspected HCC. This off-line scan is done when the disk drive is quiescent from other tasks and as such does not impact the performance of the disk drive. One alternative is to use algorithms that are currently for power management to determine when the drive will initiate an off-line scan. These algorithms basically look at the pattern of activity from the hosts to make a judgement that a lull is likely. The off-line scan can also be coordinated with power management, since enabling the off-line scan could mean that the drive would never shut down. Various levels of information can be recorded when the blocks have been scanned including for example, the date and signature level, but at a minimum a flag bit is set to record the fact of the scan. When a new signature file or Scanning Program is loaded, then the status flags should be reset so that a new scan occurs.

One advantage of doing harmful computer code scanning in the disk drive rather than in the host is that it eliminates the need for resource intensive scanning at the host level. Thus, the performance of the overall system is improved. The details of the Scanning Program are outside the scope of this invention, but existing techniques can be implemented in the intelligent disk drive ranging from the simplest "dumb" scan to complex heuristic techniques. Implementing a highly complex Scanning Program will obviously increase the cost of the drive, but could be cost effective in the overall system when host processing time is taken into account. Since complex heuristic techniques can be very time consuming, applying the HCC scan internal to the drive is an improvement over the current technique where the file is first read and uploaded to an external processor and scanned at that level. In the still more advanced heuristic algorithms, the same general process would be used; a series of blocks is read and collected in a buffer, and the algorithm is applied to the series.

This advantage of performing the scan in the intelligent disk drive is multiplied in a system in which more than one host computer shares a disk drive. The disk drive itself becomes a repository of scanned data which can safely be read by a computer which may not have an up-to-date harmful computer code program or signature set or may not have any security programs. In a distributed computing system in which a large number of computers, with varying levels of software maintenance, drive level scanning can provide a more consistent process than relying on the scan in any of multiple hosts. Consequently the HCC scan is more accurate if the latest signature set is maintained in the disk drive rather than depending upon the maintenance level of all the associated hosts. In an alternative embodiment, when a file is read back from a drive, the reading computer can verify that the level of the signature set in the disk drive is equal to or greater than its current level. Since the incoming data is scanned on the fly by the drive, the time and resources required at the host level is minimal and probably not seen by the host.

In the prior art, the disk drive contents are periodically scanned for harmful computer code, and those blocks that are infected are quarantined. In the drive according to the invention, any file requested can be scanned "on-the-fly" as the file is read and sent to the host. Thus, the user knows that whatever is load from the drive is clean, or at least as clean as the latest level of signatures allows. In the prior art process, the reading computer cannot be sure that data was not contaminated between the last scan and the present. If the signature file has been updated, then the data being sent to a host has the most recent signatures being applied to it. If the host scanned the file for HCC when it was stored, the user can be assured that the latest HCC scan technology has been applied irrespective of when it was stored, and the level of the signature file in the host that stored the data. Without this assurance, the file must be loaded into the host and scanned at the host level which is a resource consuming task.

The basic command interface of the intelligent disk drive can be implemented in a variety of ways. Entirely new commands can be defined or existing commands can be modified. One particular embodiment to illustrate the invention will be described. In the prior art SCSI environment there are sufficient commands to accomplish the task. However, in the preferred embodiment the intelligent disk drive must also act as an initiator rather than a simple slave. SCSI commands will be used as an example, but similar commands can be used for other interfaces such as IDE, Fiber Channel, etc. The SCSI communication link between the host and the disk drive uses a Command Descriptor Block (CDB). When the host sends a command down the SCSI BUS, each drive reads the command, but only that drive with the specific drive address. For example, the CDB a simple WRITE(6) command includes fields for:

operation code (0Ah)
logical unit
logical block address
transfer length
control

The first Byte contains the operation code, the next three bits contain the SCSI unit (disk drive), the next byte is the length of the transfer, and the final byte contains various control information. Other commands may require more or less bytes for the command, but the structure is similar to the one shown. For a disk drive, a simple subset of the commands include: READ(6); READ(10); READ DEFECT DATA; READ LONG; REASSIGN BLOCKS; RELEASE; RESERVE; REZERO UNIT; SEARCH DATA; SEARCH DATA EQUAL; SEARCH DATA HIGH; SEARCH DATA LOW; SEEK(6); SEEK(10); SET LIMITS; START STOP UNIT; VERIFY; WRITE(6); WRITE(10); WRITE AND VERIFY; WRITE LONG; WRITE SAME; SEND DIAGNOSTIC; and RECEIVE DIAGNOSTIC. In the common usage of the SCSI standard, there is one "initiator" on the BUS and one or more slave devices. The slaves do not send instructions over the BUS unless they receive a request from the host. But the recent SCSI standard allows for multiple "initiators" on the same BUS which could be more than one host or the initiator could also be in the intelligent disk drive. In the following discussion it is assumed that the various hosts and the intelligent disk drives all have the capability to send or receive commands from any host or intelligent disk drive on the BUS.

Figure 3:
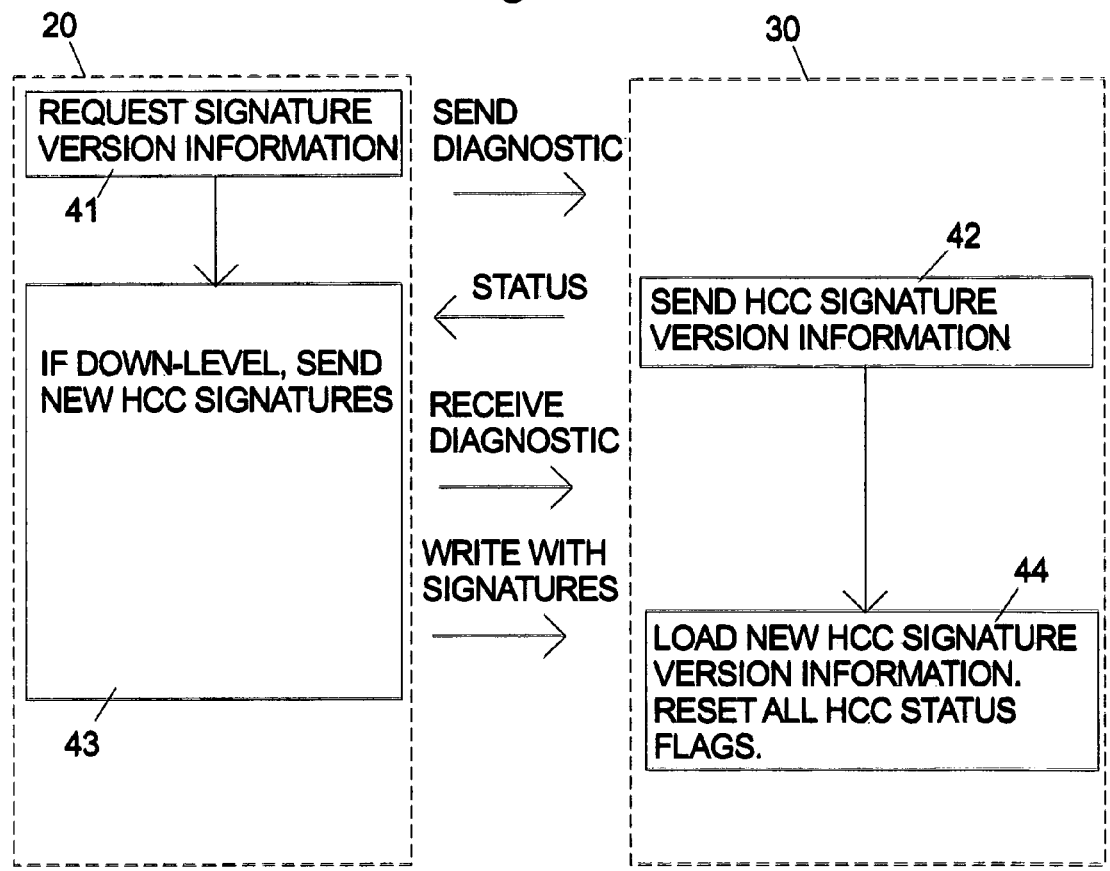
FIG. 3 is an illustration of an embodiment of the process of loading or updating the HCC signatures in a disk drive according to the invention.

The harmful computer code signatures can conveniently be written and updated through the SEND DIAGNOSTIC and RECEIVE DIAGNOSTIC commands as illustrated in FIG. 3. The host 20 can query the drive by sending a SEND DIAGNOSTIC command 41 to the disk drive. The intelligent disk drive responds by sending a block of information which includes the version level of the HCC scan currently in use 42. This mechanism can be used by any host seeking to know the signature version information. In the update process, the host checks to see if the level is current and if it is not, the host sends the intelligent disk drive a RECEIVE DIAGNOSTIC command to signal the drive to expect the signatures and then follows with a WRITE command that contains the most recent signatures 43. The drive stores the data in the WRITE command as the new signature database and resets all of the status flags to indicate that none of the data has been scanned at the new level 44. It is conceivable in the case of multiple hosts, that some of the hosts may have specific signature file or specific heuristic HCC scan algorithms that are specific to that particular host. In that embodiment, the intelligent disk drive can have more than one HCC scan data that it applies when a particular host requests or writes a file.

In the case of multiple hosts, the program in the intelligent disk drive optionally can either communicate with the host that has started a READ or WRITE command, or it can signal all the hosts on the BUS that a problem such as HCC has been detected during the read or write of a particular file from a particular host.

Figure 4:
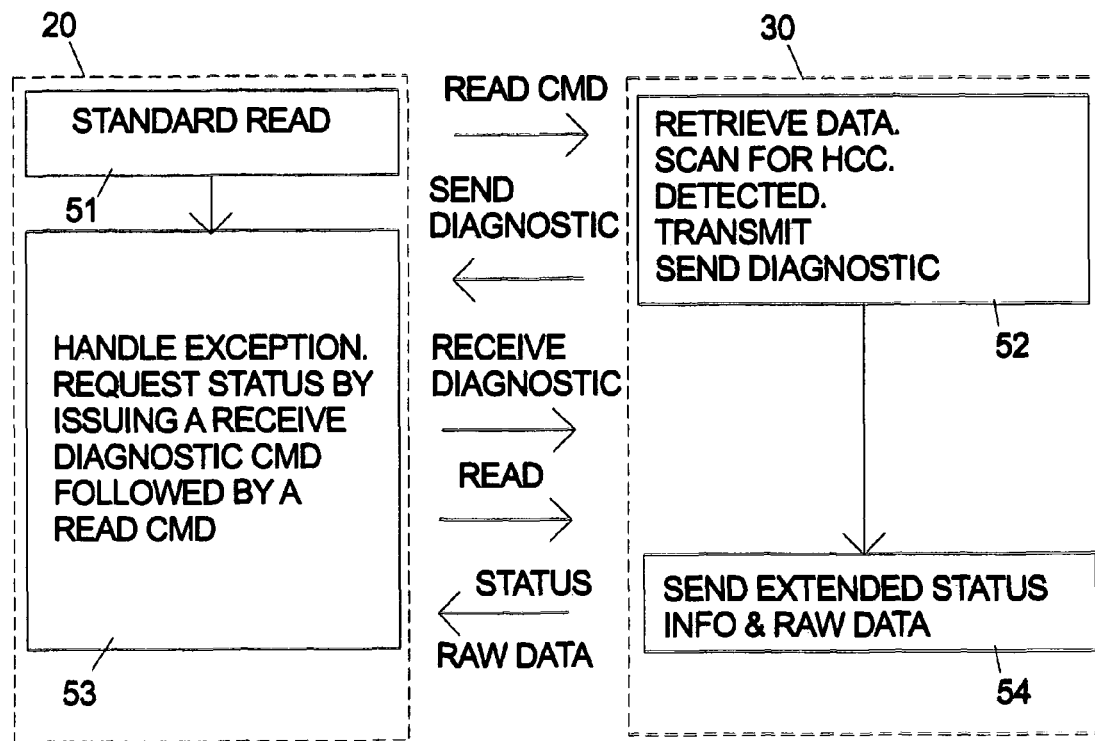
FIG. 4 is an illustration of an embodiment of the process of reading from a disk drive when HCC has been detected according to the invention.

In the system using the intelligent disk drive in which the HCC scan is contained in the disk drive, preferably every file that is read from the disk drive or written to the disk drive is scanned for harmful computer code and there would be no changes to host view of the READ command or the WRITE command except in the exception handling process when harmful computer code was detected. The scan would otherwise be transparent to the host. In this embodiment the default mode for the disk drive is to scan on both read and write commands. FIG. 4 illustrates an event sequence for a read operation 51 that results in HCC detection 52. In this embodiment the intelligent disk drive signals the host (or hosts) by transmitting a SEND DIAGNOSTIC command, which is used in the prior art for other conditions, to indicate that a problem has been detected with the file the host has requested. Once the host receives the SEND DIAGNOSTIC command, it requests the details of the problem by issuing a RECEIVE DIAGNOSTIC command to the intelligent disk drive. The diagnostic information is stored either on the disk or in the memory of the drive. The RECEIVE DIAGNOSTIC command is immediately followed by a READ command 53 which serves as a request for the status details and the raw data for the block. The intelligent disk drive interprets that request as a command to transfer the diagnostic information (quarantined information) onto the BUS where it is received by the host 54. Once the host has received the detailed information, it can decide to abort the initial READ command, accept it and use the suspect file as is, or perform remedial actions with more sophisticated recovery algorithms than normally would reside on the intelligent disk drive.

Figure 5:
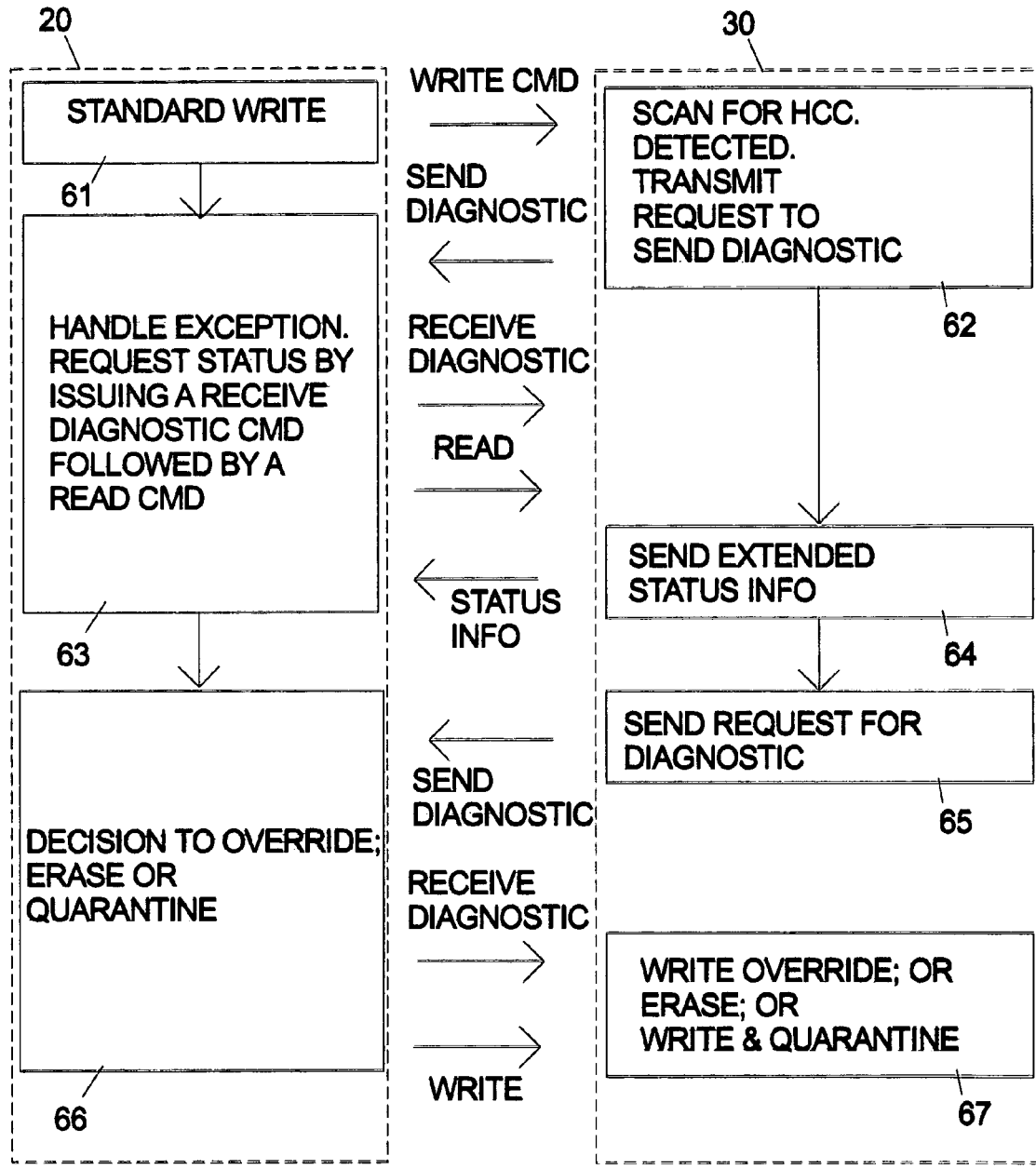
FIG. 5 is an illustration of an embodiment of the process of writing to a disk drive when HCC has been detected according to the invention.

A similar process occurs when the host issues a WRITE command 61 as illustrated in FIG. 5. If the intelligent disk drive detects an HCC in data being stored by the host, a similar set of hand shaking occurs with the drive sending the SEND DIAGNOSTIC 62 block to the host. In this embodiment, the intelligent disk drive stores the data and requests further instructions from the host through the command protocol. After receiving the SEND DIAGNOSTIC block the host then issues a RECEIVE DIAGNOSTIC command followed by a READ command 63. The drive then sends the extended status information to the host in response to the READ command 64 and follows with a SEND DIAGNOSTIC request 65. The host processes the diagnostic information and decides whether to instruct the intelligent disk drive to delete the data, save the data and set the quarantine flag, or to accept the data irrespective of the results of the HCC scan and override the scan 66. The host completes the scenario by sending a RECEIVE DIAGNOSTIC command followed by a WRITE which can either override, erase or quarantine the data 67.

In an embodiment of the intelligent disk drive having off-line scanning capability the scanning is controlled by any one of several possibilities. The intelligent disk drive can initiate a scan when it detects a possible quiescent condition, such as after a period of inactivity which could be set by the host. The scan can also be initiated by an external command from any intelligent computer. When the intelligent disk drive detects HCC during an off-line scan, it can optionally issue a SEND DIAGNOSTIC command to all the hosts on the BUS, which can then follow up with RECEIVE DIAGNOSTIC and READ commands as described above. Some hosts could decide to quarantine the file and others may not. Consequently, in some embodiments the intelligent disk drive may need a set of quarantine flags for each file, one flag for each host on the BUS.

Figure 6:
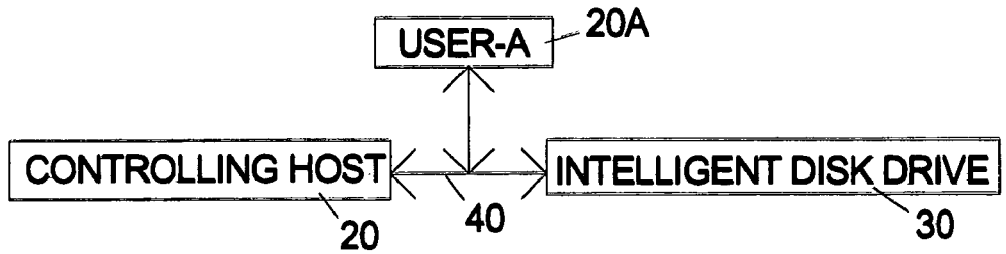
FIG. 6 is an illustration of a system where a controlling host and user computer share an intelligent disk drive according to the invention.
Figure 7:
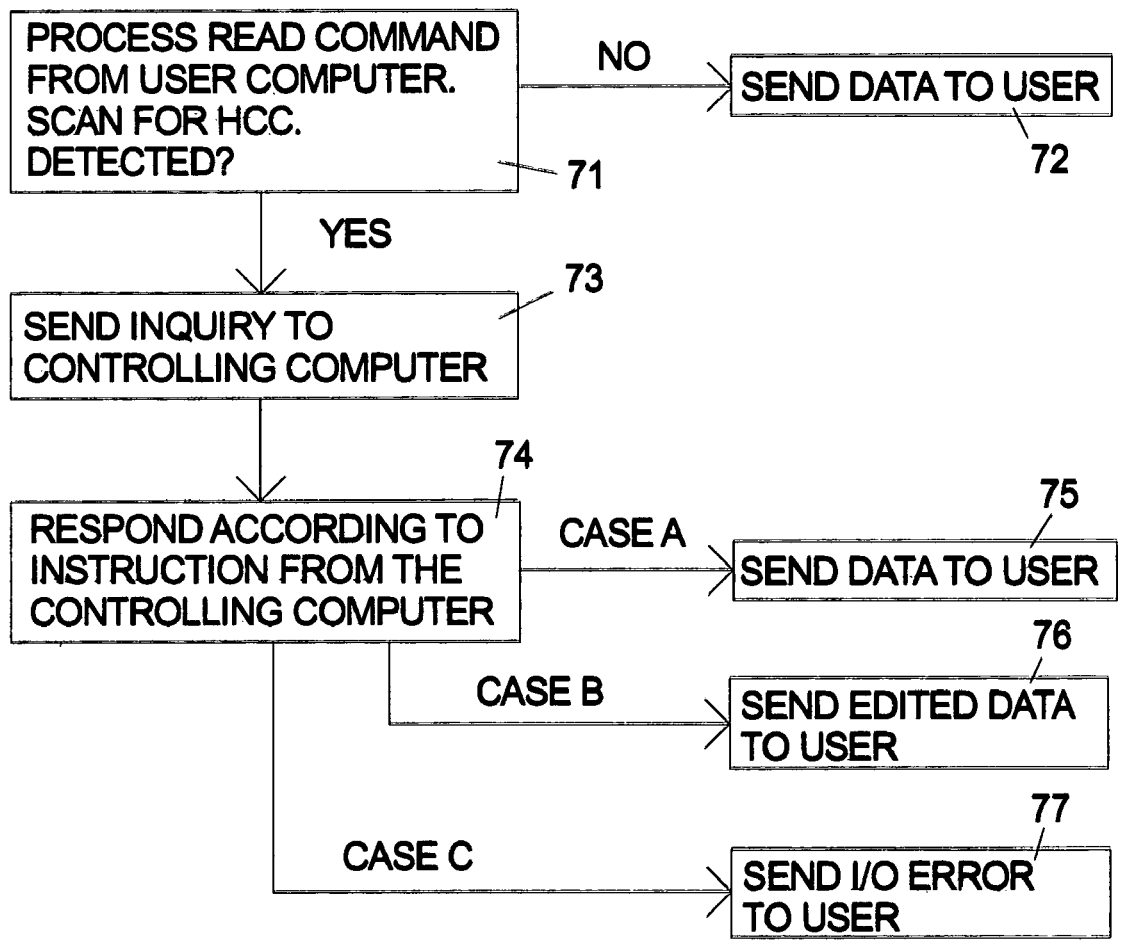
FIG. 7 is an illustration of the flow in a scenario where a controlling host and user computer share an intelligent disk drive according to the invention.

FIG. 6 is an illustration of a particular embodiment of a shared intelligent disk drive 30 with a controlling host 20 according to the invention and user computer 20A. The communication between the three or more devices is by the SCSI Bus 40. The controlling host in this example implements the full HCC command set as described, but the user computer 20A has no knowledge of the additional capabilities of the drive and simply issues standard read and write requests. If the drive detects HCC on a read or a write request from the user computer, various options can be implemented including having the disk drive return an error code and refuse to perform the operation. To the unaware user computer the operation would be an I/O error. The advantage of this embodiment is that the new intelligent disk drive can be installed in a multiple computer network with only a single controlling host having to be upgraded to handle the HCC function. The HCC protection is then transparent to the other computers. In this case, if data is stored on the intelligent disk drive by either the controlling computer or the common computer, the incoming data can be scanned for viruses by the intelligent disk drive. In the case where HCC is detected, the controlling computer can decide whether to accept or reject the file. FIG. 7 illustrates the flow in a particular scenario. The intelligent disk drive receives a read command from the user computer and scans the data for HCC 71. If no HCC is detected then the data is sent to the user computer 72. If HCC is detected, the intelligent disk drive in various embodiments could refuse the request, send the file with the corrupted code removed, send the file intact, or query the controlling computer as to what action to take. In the embodiment shown in FIG. 7, the intelligent disk drive queries the controlling computer 73 and responds to the user computer in one of three ways based on the instructions from the controlling computer 74. In case-A the data is sent to user computer despite the detection 75 which represents an override command. In case-B the data is edited in some way such as blanking out the HCC signature before sending it to the user 76. In case-C the data is an I/O error code is sent to the user 77.

In a system configuration, where there are both intelligent and common disk drives on the same BUS the intelligent disk drive can communicate directly with other the other disk drives. Therefore, in one advanced embodiment, during times of low activity, the intelligent disk drive can read files from peer common disk drives and use its HCC scanning on those files. If HCC is detected, the file is replaced with the associated virus flag set to "true". Over time, possibly very slowly, the intelligent disk drive could scan the complete disk drive array.

Figure 8:
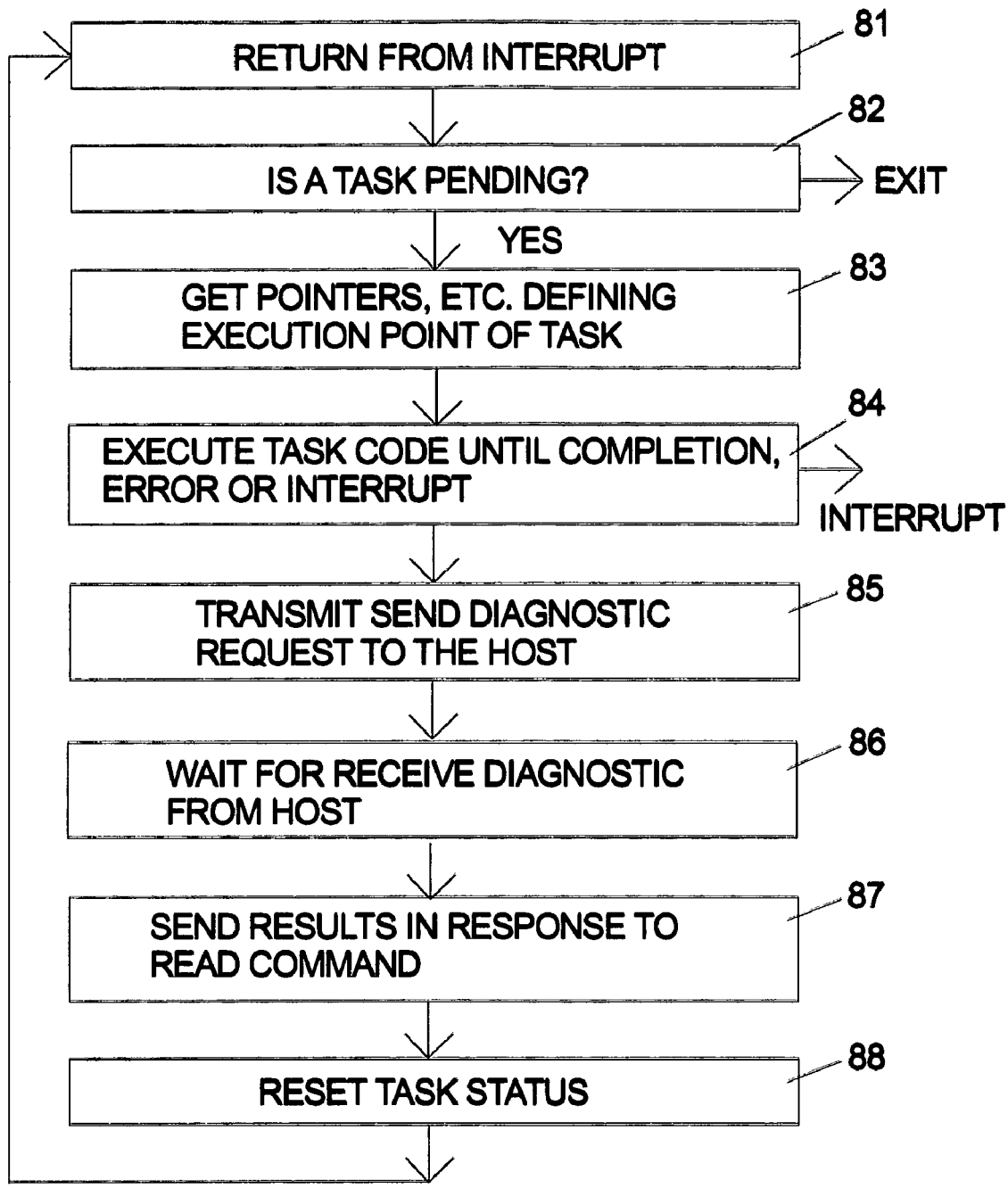
FIG. 8 is a flowchart illustrating the steps performed by an intelligent disk drive to execute an HCC task off-line or in the background according to an embodiment of the invention.

FIG. 8 is a flowchart illustrating the steps performed by an intelligent disk drive to execute an HCC task off-line or in the background according to an embodiment of the invention. The execution of various functions of the intelligent disk drive are generally interrupt driven as is the case for many systems having a plurality of real-time control and communications tasks. The receiving of commands is preferably interrupt driven and the execution of the steps shown in FIG. 8 occur after a command from a host has enabled background HCC scanning. To function as a background task the execution of the HCC task is itself subject to being interrupted by the normal control and command responses so that the conventional functions of the disk drive are performed without penalty. In the scenario shown in FIG. 8 upon return from an interrupt 81 the scanning program preferably checks for a pending HCC task 82. The status flags and pointers associated with the HCC task will record whether an HCC background task is pending and sufficient information to allow the execution of the task to resume. This status information must be saved whenever the HCC task is interrupted (not shown) and it is reloaded when the task execution is resumed 83. The execution of the task continues until another interrupt occurs, an error is encountered or the task is completed 84. For an error or completion the scanning program sends a SEND DIAGNOSTIC request to the host 85. The disk drive waits for the host to send the RECEIVE DIAGNOSTIC command 86 and then sends the block of data for the error or completion to the host in response to the next read command 87. The scanning program then resets the task status flags to indicate that no task is pending 88 and returns to normal interrupt driven processing.

The invention has been described with respect to particular embodiments, but other uses and applications for the techniques according to the invention will be apparent to those skilled in the art.

The invention claimed is:

1. A disk drive comprising:
a processor and a memory for storing data and a program for the processor;
a nonvolatile memory for storing user data received from a host computer;
means for receiving, from the host computer, a scanning program for execution by the processor to scan data for harmful computer code in stored user data; and
means for signaling the host computer that harmful computer code has been found in stored user data, the means for signaling including means for sending a request for a diagnostic inquiry to the host computer and means for responding to the diagnostic inquiry by sending information to the host computer identifying the harmful computer code signature which was detected.

2. The disk drive of claim 1 wherein the scanning program scans stored user data for a set of harmful computer code signatures and the disk drive further comprises means for receiving a set of harmful computer code signatures from the host computer and for storing the set of harmful computer code signatures.

3. The disk drive of claim 2 wherein the means for receiving the set of harmful computer code signatures further comprises means for accepting the set of harmful computer code signatures as data in a write command which follows a diagnostic command.

4. The disk drive of claim 1 wherein the means for responding to the diagnostic inquiry further comprises means for sending information to the host including the user data in which the harmful computer code signature which was detected.

5. The disk drive of claim 1 wherein the means for scanning data operates off-line and the means for signaling a host computer initiates a communication to the host computer.

6. The disk drive of claim 1 wherein disk drive is connected to a user computer and the host computer and the means for signaling a host computer initiates a communication to the host computer when harmful computer code has been found in data requested by the user computer and responds to communications from the host computer to disposition of the user data requested by the user computer.

7. A method of operating a disk drive comprising the steps of:
receiving user data from a host computer;
storing the user in a nonvolatile memory;
receiving, from the host computer, a scanning program for execution by the disk drive to scan stored user data for harmful computer code; and
executing the scanning program to scan selected blocks of user data for the set of harmful computer code and upon detecting a harmful computer code signaling the host computer that harmful computer code has been found in a block of user data by sending a request to the host computer for a diagnostic inquiry, then receiving a read diagnostic command from the host computer and then responding to the diagnostic inquiry from the host computer with information identifying the user data in which harmful computer code has been detected.

8. The method of claim 7 wherein the step of receiving further comprises receiving a diagnostic command, then accepting data in a write command which follows the diagnostic command as the scanning program.

9. The method of claim 7 further comprising the step of receiving a set of harmful computer code signatures from a host computer, and wherein the step of executing the scanning program further comprises scanning the selected blocks of user data for the harmful computer code signatures.

10. The method of claim 9 wherein the step of receiving the set of harmful computer code signatures further comprises the step of resetting a set of status indicators for blocks of user data and the step of scanning selected blocks of user data further comprises setting a status indicator for each block of user data to record the results of scanning.

11. The method of claim 9 the step of receiving the set of harmful computer code signatures further comprises receiving a diagnostic command, then accepting data in a write command which follows the diagnostic command as the set of harmful computer code signatures.

12. The method of claim 7 wherein the step of responding to the diagnostic inquiry further comprises sending information to the host identifying the harmful computer code signature which was detected in the block of user data.

13. The method of claim 7 wherein the step of responding to the diagnostic inquiry further comprises sending information to the host including the block of user data in which the harmful computer code signature was detected.

14. The method of claim 7 wherein the step of executing the scanning program operates off-line and the step of signaling the host computer initiates a communication to the host computer.

15. The method of claim 7 wherein the disk drive is connected to a user computer and the host computer and the step of signaling the host computer when harmful computer code has been found in data requested by the user computer and the method further comprises responding to communications from the host computer to disposition of the data requested by the user computer.

16. The method of claim 7 wherein the disk drive is connected to a second data storage device and the method further comprises reading data from the second data storage device, scanning the data from the second data storage device for harmful computer code and signaling the host computer results of the scanning of the data from the second data storage device.

* * * * *